(12) United States Patent
Sachedina et al.

(10) Patent No.: US 7,013,463 B2
(45) Date of Patent: Mar. 14, 2006

(54) LATCH MECHANISM FOR CONCURRENT COMPUTING ENVIRONMENTS

(75) Inventors: Aamer Sachedina, Richmond Hill (CA); Michael J. Winer, Markham (CA); Robert W. Lyle, Morgan Hill, CA (US); Matthew A. Huras, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 09/894,215

(22) Filed: Jun. 27, 2001

(65) Prior Publication Data

US 2002/0042809 A1 Apr. 11, 2002

(30) Foreign Application Priority Data

Oct. 6, 2000 (CA) .................................. 2322613

(51) Int. Cl.
*G06F 9/46* (2006.01)
(52) U.S. Cl. ..................................................... 718/100
(58) Field of Classification Search ......... 718/100–108
See application file for complete search history.

(56) References Cited

U.S. PATENT DOCUMENTS

| | | | |
|---|---|---|---|
| 4,509,119 A | 4/1985 | Gumaer et al. | 364/200 |
| 4,660,169 A | 4/1987 | Norgren et al. | 364/900 |
| 5,182,808 A | 1/1993 | Bagnoli et al. | 395/725 |
| 5,222,238 A | 6/1993 | Zobre et al. | 395/650 |
| 5,634,072 A * | 5/1997 | Allen et al. | 718/104 |
| 5,937,199 A | 8/1999 | Temple | 395/735 |
| 6,012,082 A | 1/2000 | Kar | 709/107 |
| 6,574,654 B1 * | 6/2003 | Simmons et al. | 718/104 |
| 6,598,068 B1 * | 7/2003 | Clark | 718/104 |

OTHER PUBLICATIONS

"Cycle Steal at Rename Register," IBM Technical Disclosure Bulletin, Thomson Delphion, pp. 1-2.
"Space Recovery When Concurrently Linking Program Modules," IBM Technical Disclosure Bulletin, Thompson Delphion, pp. 1-3.

* cited by examiner

Primary Examiner—Meng-Al T. An
Assistant Examiner—Kenneth Tang
(74) Attorney, Agent, or Firm—Sawyer Law Group LLP

(57) ABSTRACT

A system, method and computer readable medium containing programming structions for an improved latch mechanism for use in a programming environment running concurrent tasks is disclosed. According to one aspect of the present invention, a latch is provided to a first task which is requesting access to a resource. After such access, the first task holds the latch, which is also released from the first task. The first task holding the latch marks the latch stealable, and if the latch is not marked stolen by another task, the first task can mark the latch unstealable. In another embodiment of the present invention, if the first task is provided a latch marked stealable, the resource associated with the stealable latch will be placed in a consistent state before the first task accesses the resource.

6 Claims, 2 Drawing Sheets

LATCH MECHANISM FOR CONCURRENT COMPUTING ENVIRONMENTS

FIELD OF THE INVENTION

The present invention is directed to an improvement in computing systems and in particular to a latching mechanism for concurrent computer environments.

BACKGROUND OF THE INVENTION

Concurrent software systems establish primitives to allow concurrently executing tasks (threads or processes) to share common resources. Such primitives are often referred to as "latches".

It is known to use an exclusive latching mechanism to permit or deny access to a resource associated with a latch. If a first task holds a latch to a resource, which permits only exclusive access, then a second task requiring the resource must wait until the holding task releases the latch before being able to access the latch.

More complex latches allow both shared and exclusive access to the resource. If a first task holds the latch to a resource in exclusive mode, then a second task requiring the resource must wait until the holding task releases the latch. Alternatively, if a first task holds the latch in share mode, then a second task will be granted access to the resource at the same time, if it requests the latch in share mode as well. If the second task requests the latch in exclusive mode, then it must wait until all tasks holding the latch in share mode release the latch.

Once a latch-holding task has used the latched resource, the resource may be in an inconsistent or unstable state which makes the resource unusable by other tasks. Therefore, before the holding task relinquishes the latch the holding task must carry out steps to return the resource to a consistent or stable state. This may be accomplished by the holding task executing a subroutine that will "clean up" the resource. The resource may then be used by other tasks.

From the description above, it can be seen that there is an overhead cost in executing computer code containing concurrency primitives such as latches. This overhead comprises several hidden costs, including the cost of executing instructions required for the latch-holding task to give up the latch, the cost of informing other tasks requesting the resource of the change of the latch's state when the latch is released, and the cost incurred in making the resource protected by the latch consistent so that it may be accessed by other tasks (the cost of executing the "clean-up subroutine").

In many systems, the same task repeatedly requests, and releases, the same latch before another task requests the latch. If the system overhead costs referred to above are high, the latching and unlatching steps will result in a decreased efficiency of the system resulting in the overall throughput of the system being reduced.

Certain prior art systems attempt to avoid the above inefficiency by permitting latch-holding task to continue to hold the latch rather than relinquishing it once the task is finished using the resource. In such a system, the latch-holding task must periodically poll the latch to see if there are waiting tasks which have requested it. However, this approach may starve a waiting task because although the resource is not being used, until the latch-holding task polls the latch, the latch is not made available. Further, whenever the latch-holding task polls the latch, CPU time is used.

It is therefore desirable to have a means of efficiently managing concurrency primitives such as latches with reduced system overhead by releasing latches only when necessary, while avoiding the need for polling the latch. Such efficient management would prevent starvation of waiting tasks while saving CPU time.

SUMMARY OF THE INVENTION

A system, method and computer readable medium containing programming instructions for an improved latch mechanism for use in a programming environment running concurrent tasks is disclosed. According to one aspect of the present invention, a latch is provided to a first task which is requesting access to a resource. After such access, the first task holds the latch, which is also released from the first task. The first task holding the latch marks the latch stealable, and if the latch is not marked stolen by another task, the first task can mark the latch unstealable. In another embodiment of the resent invention, if the first task is provided a latch marked stealable, the resource associated with the stealable latch will be placed in a consistent state before the first task accesses the resource.

Advantages of the present invention include a potential efficiency resulting from the ability for a task to reaccess a resource without the need to fully release and reacquire the latch for the resource and without the need to carry out a subroutine to put the resource in a consistent state.

DETAILED DESCRIPTION OF THE PREFERRED EMBODIMENT

Figure 1:
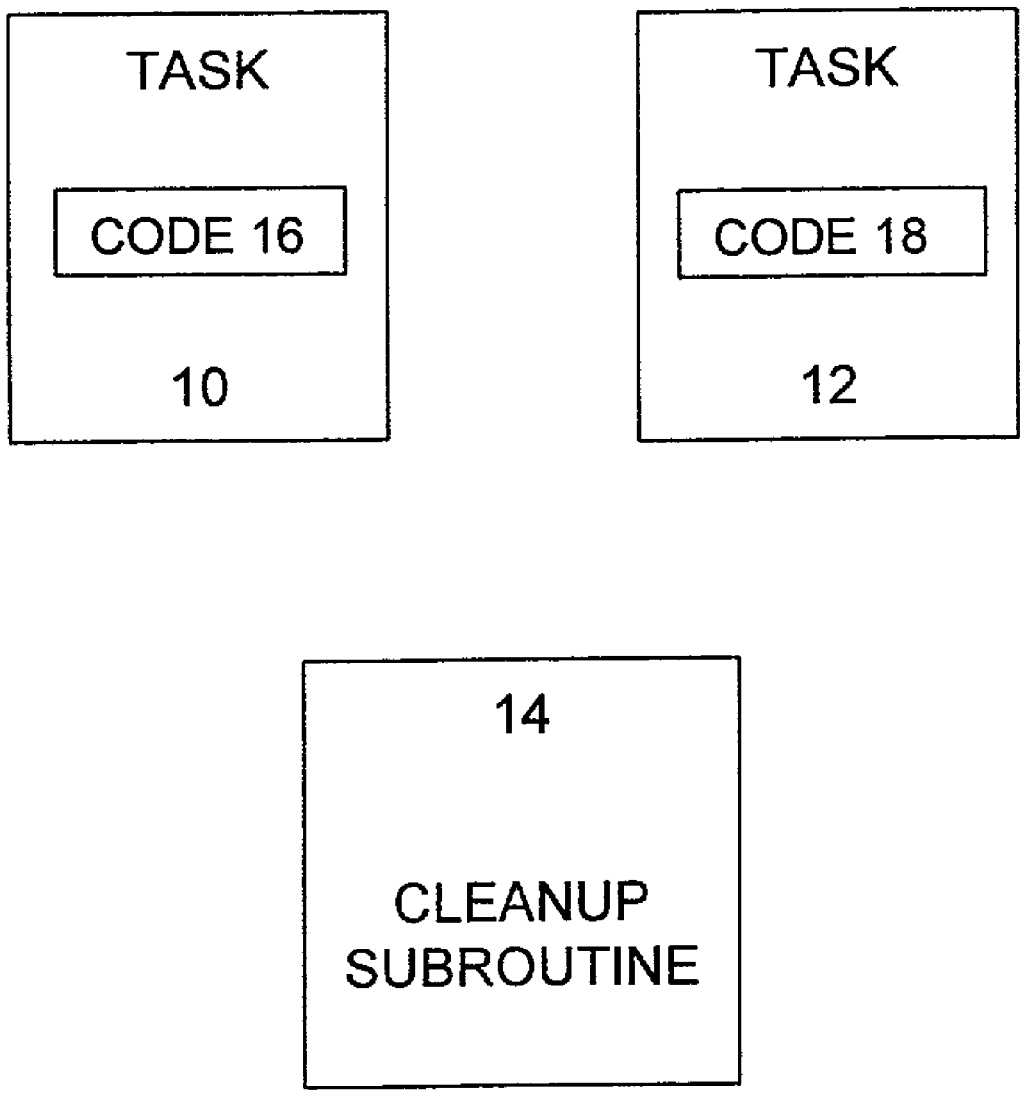
FIG. 1 illustrates, in a block diagram format, example tasks and a cleanup subroutine used in the description of the latch mechanism of the preferred embodiment.

FIG. 1 depicts tasks 10, 12, and cleanup subroutine 14. Tasks 10, 12 are tasks requiring the use of a resource or resources (not shown) that are subject to access control by a latch. Each of tasks 10, 12 include code that makes use of the latched resource. These are shown as code blocks 16, 18 in tasks 10, 12, respectively. In the example shown in FIG. 1, code 16 may be repeatedly executed within task 10. In the description of the preferred embodiment, tasks are referred to as including computer code and as executing on a computer system. It will be understood by those skilled in the art that the preferred embodiment is applicable to concurrent programming constructs such as threads and concurrent processes. The term task is used as a general term and is intended to include concurrent processes, threads, and the like.

The latch mechanism implemented in the preferred embodiment extends latches as used in the prior art. When the preferred embodiment latch mechanism is used in the prior art manner, a call to a latch( ) function is made by task 10 before code 16 is executed. When code 16 has completed execution, task 10 calls an unlatch( ) function. As is provided in prior art systems, in the latch mechanism of the preferred embodiment, task 10 must wait until the call to the latch( ) function returns the latch to task 10. When task 10 waits for the latch the task is placed on a list of waiters for the latch.

In this way, task 10 waits on the latch and then holds the exclusive latch while code 16 is executed. When execution of code 16 is completed, the unlatch( ) function is called and the latch is made available to other tasks. In a similar manner, this prior art use of the latch mechanism permits task 12 to bracket code 18 with calls to the latch( ) and unlatch( ) functions. If task 12 is waiting on the latch (and is therefore on the list of waiters maintained by the latch), the unlatch( ) function called by task 10 results in the latch waking up task 12. Task 12 then acquires the latch and is able to access the latched resource by executing code 18.

As is the case with prior art latch mechanisms, information regarding the state of the latch is maintained, including its mode and the waiters on the latch. The mode indicates whether the latch is in SHARE or EXCLUSIVE mode. This information is used in the determination of whether a new requester is to be provided with the latch. A task requesting the latch will specify whether the latch is required in shared or exclusive mode. The latch also has a list of waiters with which it is associated. The list contains information on the number of tasks which have queued to use the resource, and is used to determine whether any tasks need to be notified when the latch is unlatched by a holding task. In this way, the latch mechanism of the preferred embodiment is similar to that of prior art concurrency primitives.

However, using the latch mechanism of the preferred embodiment also makes it possible for a task such as task 10, which executes such that code 16 is repeatedly executed (either repeatedly within task 10 or by repeated execution of task 10 itself), to mark a latch as STEALABLE, rather than relinquishing the latch entirely. With reference to the example of FIG. 1, the initial execution of code 16 is preceded by a call to the latch( ) function, as in the prior art. However, at the termination of execution of code 16, the latch of the preferred embodiment permits task 10 to carry out a soft release of the latch. This soft release, as described below, permits task 10 to avoid certain overhead costs associated with a call to the unlatch( ) function. This potentially makes the computer code more efficient where task 10 reacquires the latch with no intervening access to the resource by other tasks.

As in the prior art, data is associated with the preferred embodiment latch to specify a mode, a list of waiters, and a count of the number of waiters for the latch. In addition, the preferred embodiment latch mechanism provides that the latch may have a global flag and a subroutine associated with it for each holder of the latch (the latch may be held by multiple tasks if it is shareable). In the preferred embodiment, the latch maintains the address for the global flag and the subroutine for each task holding the latch.

The subroutine associated with the latch that is specified by a latch holder task is a subroutine that, when executed, will return the latched resource to a consistent or stable state. For the example of FIG. 1, the code to clean up the resource after use by code 16 in task 10 is encapsulated in a subroutine that may be called by task 10 or by other tasks or threads. This is shown in FIG. 1 as cleanup subroutine 14. The flag associated with the latch is used to indicate whether the latch is marked as STEALABLE, STOLEN or UNSTEALABLE, as is described below.

The programmer's interface for the latch of the preferred embodiment is implemented using two additional functions: mark_stealable( ) and mark_unstealable( ). The first of these is used to carry out the soft release of the latch, referred to above. Thus where a task is holding the latch, but it is expected that the task may seek to reaccess the latched resource imminently, the task may invoke the mark_stealable( ) function rather than the unlatch( ) function. The task will continue to hold the latch but it will be possible for other tasks to acquire or "steal" the latch.

When the mark_stealable( ) function is called, the task calling the function must provide a global flag and a cleanup subroutine (or pointers to them or addresses for them). The global flag for the function is set to the value STEALABLE by the mark_stealable function. While the latch is marked STEALABLE by the holding task, the holder cannot make use of the resource. Thus in the example of FIG. 1, if task 10 calls the mark_stealable( ) function for the latch associated with code 16, the logic of task 10 must ensure that code 16 is not executed, except as set out below.

If the latch is in exclusive mode, after the latch is marked STEALABLE the holding task may seek to again use the resource, or a different task may seek to acquire the latch. Where the holding task seeks to access the resource, the task must first call the mark_unstealable( ) function. If the holder's global flag for the latch retains the value STEALABLE, then the mark_unstealable( ) function marks the flag UNSTEALABLE and the holding task may again access the resource.

In terms of the example of FIG. 1, if task 10 holds the latch but has marked it STEALABLE and if task 10 again seeks to execute code 16, task 10 must first call the function $mark_{13}$ unstealable( ). If $mark_{13}$ unstealable( ) returns with a value to indicate that the holder's global flag for that latch is STEALABLE then task 10 may execute code 16 to access the latched resource. Thus task 10 may avoid executing cleanup subroutine 14 between successive accesses to the resource made by code 16.

The second possible event referred to above occurs where a second task requests the exclusive latch before the holding task reaccesses the resource (by calling mark unstealable( )). In this case, the second task (task 12 in the example of FIG. 1), will seek to gain access to the latch in the usual manner, using the latch( ) function. In the preferred embodiment, the latch( ) function will provide the latch to the second task if it is available. The latch is available if it is not held by another task or if it is held by another task in a mode compatible with the mode in which the second task is seeking the latch.

In addition, however, even where the latch is shown as being unavailable, a further check is carried out to determine if the latch being held by another task is marked STEALABLE. In the case of an exclusive latch, there will only be one global flag for the latch to be compared to determine if the latch is STEALABLE or not. If in such a case the latch is STEALABLE, then the latch( ) function will acquire the latch for the second task and will mark the latch STOLEN by the appropriate change to the value of the global flag. In addition, the cleanup subroutine associated with the latch by the holding task will be executed by the latch( ) function before accessing the resource. This ensures that the resource is returned to a stable state before access is permitted by another task.

In terms of the example of FIG. 1, when task 10 calls mark_stealable( ) its flag for the latch is set to STEALABLE, and subroutine 14 is associated with the latch. When task 12 executes a latch( ) function (located prior to code 18), the flag will be marked STOLEN and cleanup subroutine 14 will be executed before execution of code 18.

Where the global flag associated with the latch for a holding task is set to STOLEN, and the holding task then seeks to access the latched resource by executing the mark_unstealable( ) function, the function returns the STOLEN value. The holding task must then call the latch( ) function to acquire the latch in the usual manner. In this case, the latch being marked stolen indicates that there has been an intervening use of the resource by another task and that the holding task's cleanup subroutine has been executed. Once the task acquires the latch by use of the latch( ) function, it is possible for the task to then use mark_stealable( ) to again make the latch stealable.

Where the latch is held in share mode, the latch( ) function contains logic such that a task calling the latch( ) function will only be permitted to steal the latch where all holders of the latch have marked the latch as stealable. In the preferred embodiment, the latch maintains not only the count of the number of current holders, but also the count of the number of tasks that marked the latch as STEALABLE. These two numbers can therefore be compared in determining whether a latch in share mode is able to be stolen.

As will be apparent, the efficient use of the mark_stealable and mark_unstealable functions for the latch mechanism of the preferred embodiment by a task repeatedly using a resource will depend on an assessment of the likelihood that there will be interleaved requests for the resource by other tasks. Where the likelihood of such intervening requests for the resource is relatively low, or the cost of the clean up of the resource is relatively high, the use of the stealable latch mechanism is more advantageous. Where there are significant interleaved requests for the resource, or where there is minimal clean up of the resource required, the advantage to the stealable latch mechanism is lessened.

Therefore, stealable concurrency primitives are a viable option for reducing system overhead if the hidden cost of releasing the latch (making the resource consistent) is much higher than the combined cost to mark the latch stolen and to steal the latch, and/or there is a low probability that the latch will be stolen, and/or the cost of running the unlatch code is much greater than the cost to mark the latch stolen.

In the preferred embodiment, it is possible for a task to self-tune to determine whether there is a benefit to using the stealable aspect of the latch. A candidate task for use of the stealable feature of the latch initially makes use of the mark_stealable( ) function. The task maintains statistics regarding how often the mark_unstealable( ) function returns the STOLEN value. Where the proportion of returns with the STOLEN value is high, compared to the returns with the STEALABLE value, the task may revert to using the latch by calling latch( ) and unlatch( ), only.

Figure 2:
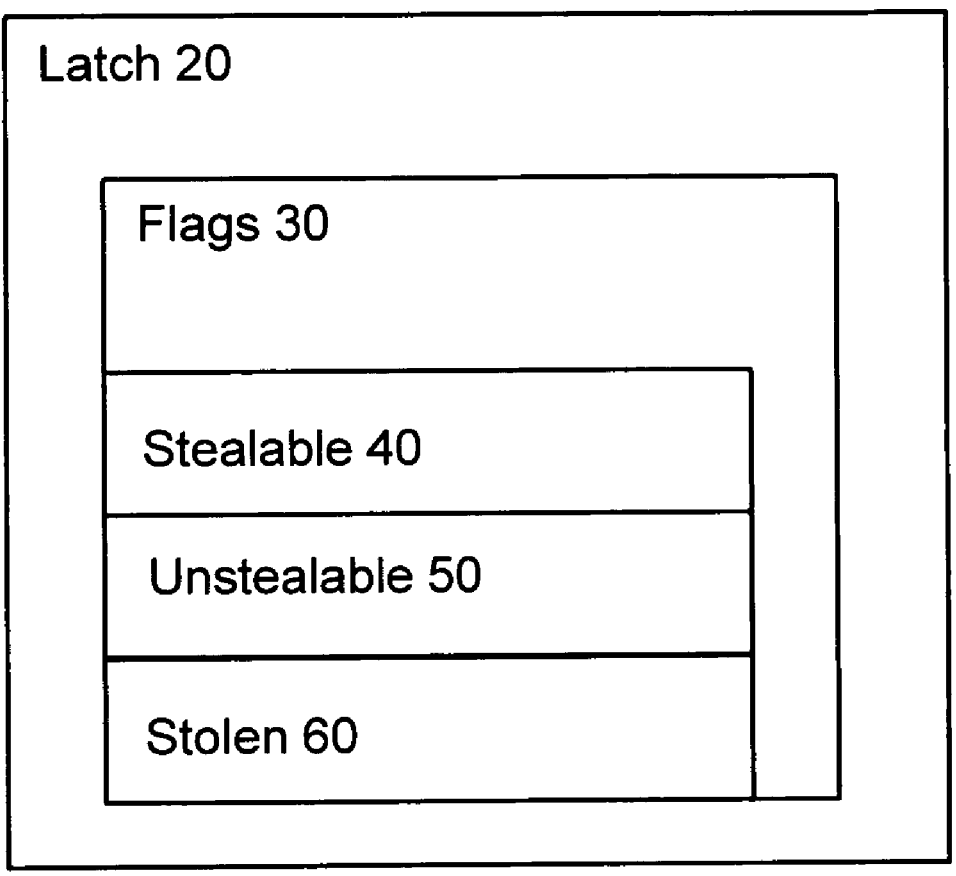
FIG. 2 illustrates, in a block diagram format, a latch with flags marked stealable, unstealable, and stolen.

FIG. 2 illustrates, in a block diagram format, a latch 20 with associated flags 30 marked stealable 40, unstealable 50 and stolen 60.

It will be understood by those skilled in the art that the preferred embodiment may be adapted to other programming language environments in which a resource allocation method analogous to the latch concurrency primitive is provided.

Although a preferred embodiment of the present invention has been described here in detail, it will be appreciated by those skilled in the art that variations may be made thereto without departing from the spirit of the invention or the scope of the appended claims.

What is claimed is:

1. A computer-implemented method for providing access to a resource in a programming environment supporting concurrent tasks, comprising:
    (a) providing a latch to a first task, wherein the first task requests the latch to obtain access to the resource;
    (b) accessing the resource with the first task;
    (c) marking the latch stealable and held by a holding task, rather than releasing the latch, wherein marking the latch stealable permits a second task to acquire the latch in response to the latch being marked stealable;
    (d) marking the latch unstealable if the first task again requests the latch to obtain access to the resource prior to the latch being requested by a second task seeking access to the resource; and
    (e) marking a set of flags for a latch:
        i. stealable, wherein the resource is not placed in a consistent state because the latch is marked stealable;
        ii. stolen, wherein the resource is placed in a consistent state and then accessed by the second task; or
        iii. unstealable, wherein the first task again requests the latch to obtain access to the resource and the latch has not been requested by a second task seeking access to the resource, as requested by the latch.

2. The method of claim 1, wherein providing a latch to a first task further comprises:
    (a1) providing to the first task a latch marked stealable and held by a holding task; and
    (a2) placing the resource in a consistent state prior to the first task accessing the resource.

3. A computer readable medium containing program instructions for providing access to a resource in a programming environment supporting concurrent tasks, the program instructions for:
    (a) providing a latch to a first task, wherein the first task requests the latch to obtain access to the resource;
    (b) accessing the resource with the first task;
    (c) marking the latch stealable and held by a holding task, rather than releasing the latch, wherein marking the latch stealable permits a second task to acquire the latch in response to the latch being marked stealable;
    (d) marking the latch unstealable if the first task again requests the latch to obtain access to the resource prior to the latch being requested by a second task seeking access to the resource; and
    (e) marking a set of flags for a latch:
        iv. stealable, wherein the resource is not placed in a consistent state because the latch is marked stealable;
        v. stolen, wherein the resource is placed in a consistent state and then accessed by the second task; or
        vi. unstealable, wherein the first task again requests the latch to obtain access to the resource and the latch has not been requested by a second task seeking access to the resource, as requested by the latch.

4. The computer readable medium of claim 3, wherein providing a latch to a first task further comprises:
    (a1) providing to the first task a latch marked stealable and held by a holding task; and
    (a2) placing the resource in a consistent state prior to the first task accessing the resource.

5. A latch mechanism for a computer programming environment supporting concurrent tasks, comprising:
    means for providing a latch for a resource to a first task, whereby the first task holds the latch;
    means for the first task to mark the latch stealable and held by a holding task, rather than releasing the latch, wherein marking the latch stealable permits a second task to acquire the latch in response to the latch being marked stealable;
    means for the first task to mark the latch unstealable if the first task again requests the latch to obtain access to the resource prior to the latch being requested by a second task seeking access to the latch; and
    means for using a set of flags for marking a latch stealable, wherein the resource is not placed in a consistent state because the latch is marked stealable, stolen, wherein the resource is placed in a consistent state and then accessed by the second task, or unstealable, wherein the first task is again provided with the latch and the latch has not been provided to a second task seeking access to the resource.

6. The latch mechanism of claim 5, wherein the means for providing a latch to the first task further comprising:

means for the first task to be provided, on request, with a latch marked stealable and held by a holding task, and means for placing any resources associated with the latch in a consistent state prior to the first task accessing the resources.

* * * * *

UNITED STATES PATENT AND TRADEMARK OFFICE
CERTIFICATE OF CORRECTION

| | | |
|---|---|---|
| PATENT NO. | : 7,013,463 B2 | Page 1 of 1 |
| APPLICATION NO. | : 09/894215 | |
| DATED | : March 14, 2006 | |
| INVENTOR(S) | : Sachedina et al. | |

It is certified that error appears in the above-identified patent and that said Letters Patent is hereby corrected as shown below:

Column 2,
Line 20, delete "resent" and replace with -- present --.

Signed and Sealed this

Twenty-seventh Day of June, 2006

JON W. DUDAS
*Director of the United States Patent and Trademark Office*